Oct. 13, 1964  J. J. DUNTON  3,152,526
MECHANISM FOR THE PRODUCTION OF CARTON BLANKS
Filed Nov. 1, 1962  7 Sheets-Sheet 1
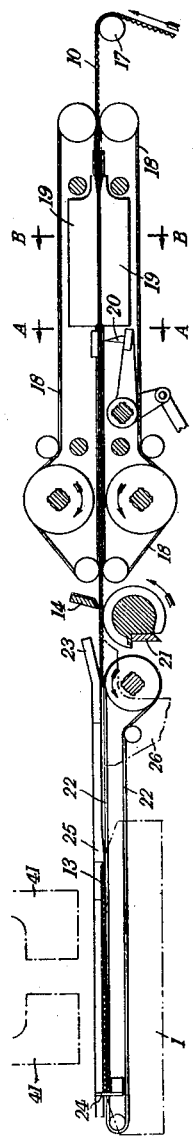
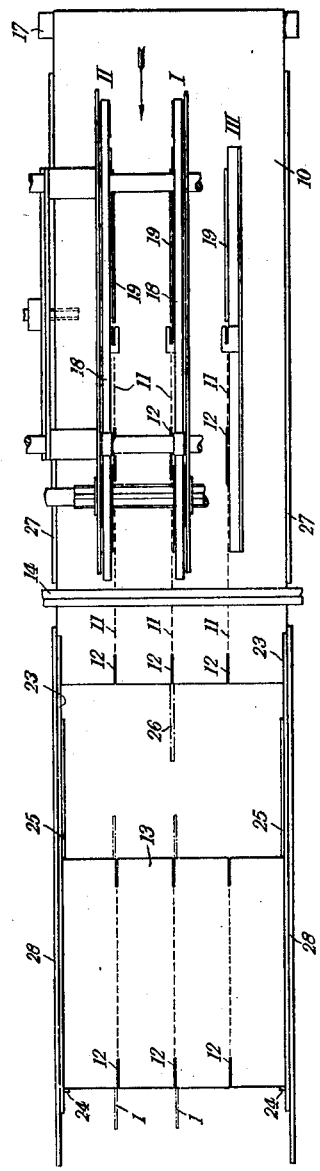
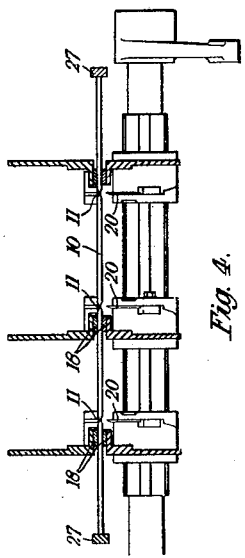
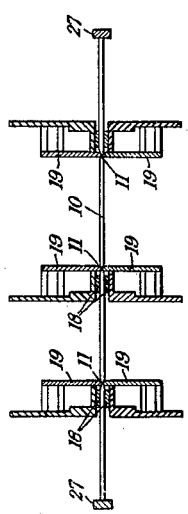

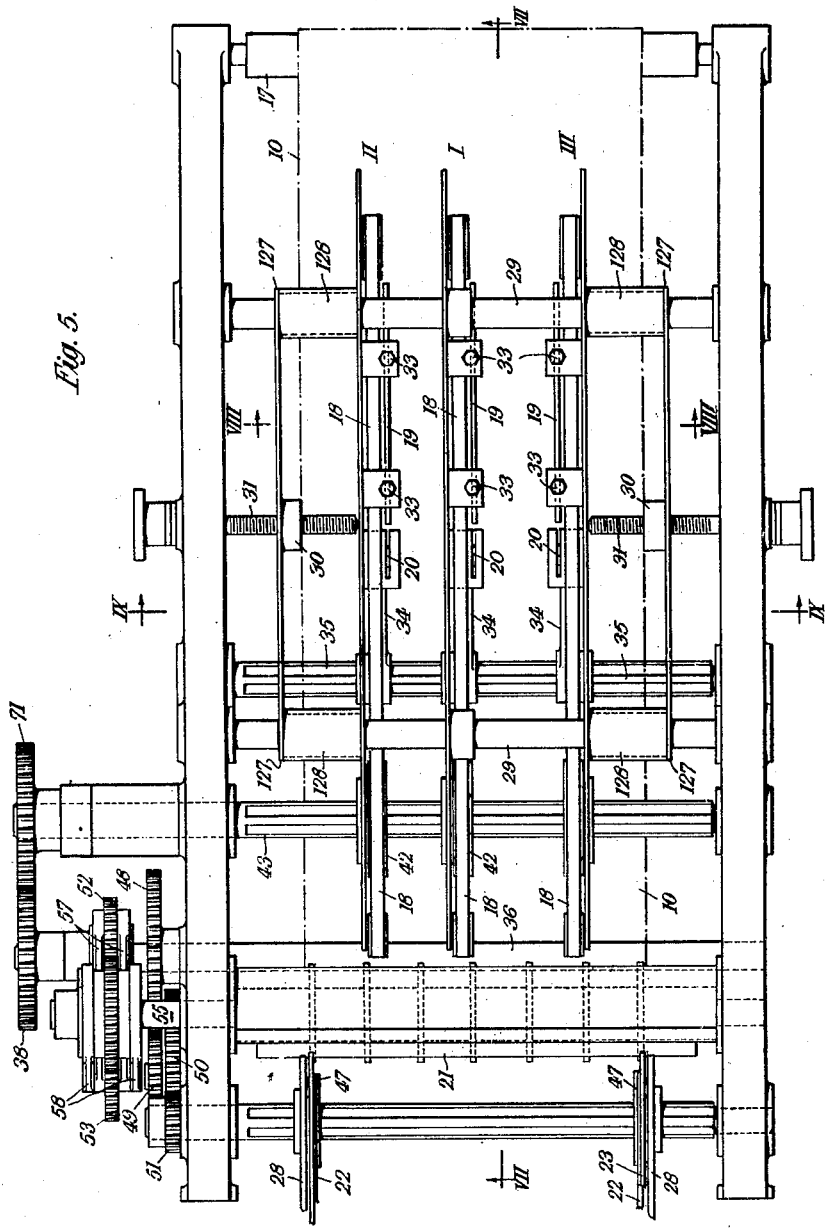

Oct. 13, 1964  J. J. DUNTON  3,152,526
MECHANISM FOR THE PRODUCTION OF CARTON BLANKS
Filed Nov. 1, 1962  7 Sheets-Sheet 3
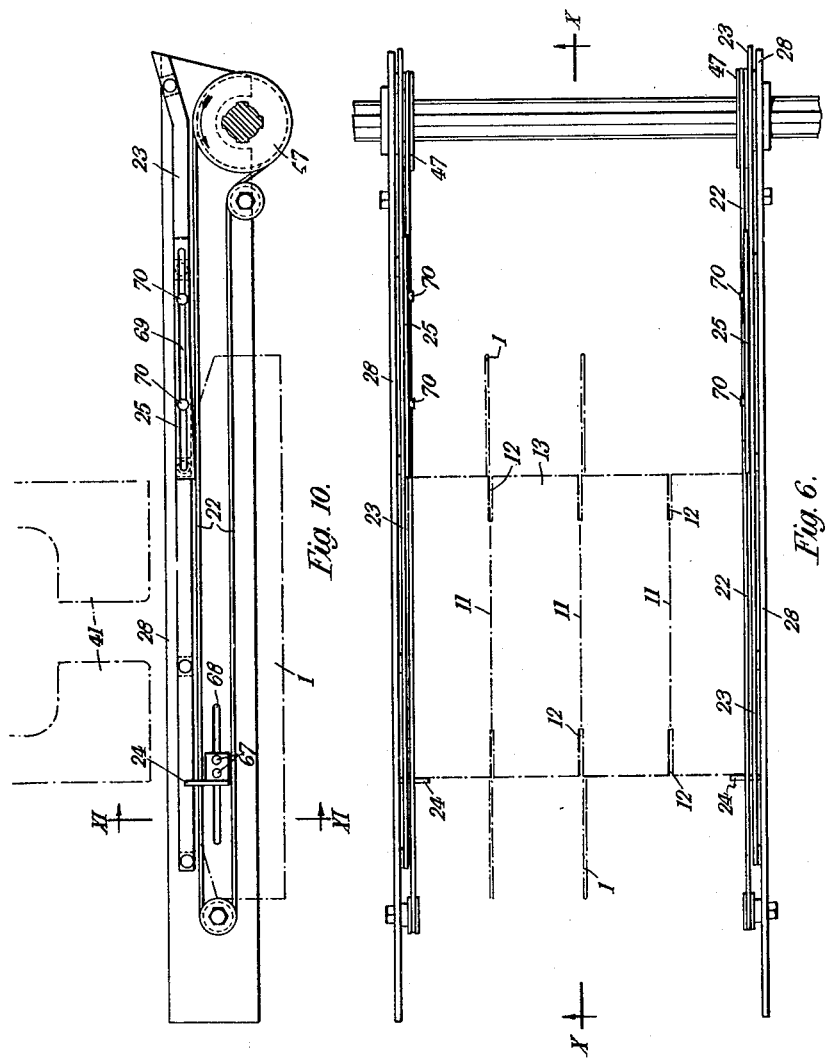
INVENTOR
Joseph J. Dunton
BY Watson, Cole, Grindle & Watson
ATTORNEYS

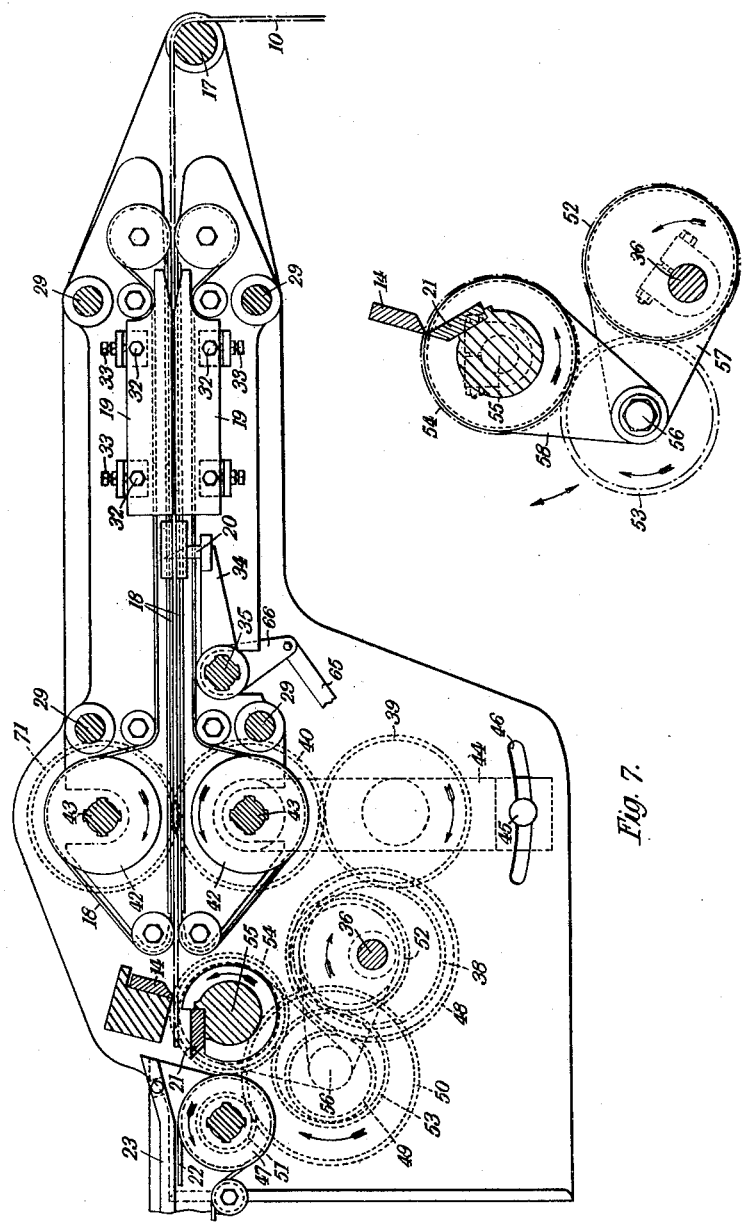

Oct. 13, 1964  J. J. DUNTON  3,152,526
MECHANISM FOR THE PRODUCTION OF CARTON BLANKS
Filed Nov. 1, 1962  7 Sheets-Sheet 5
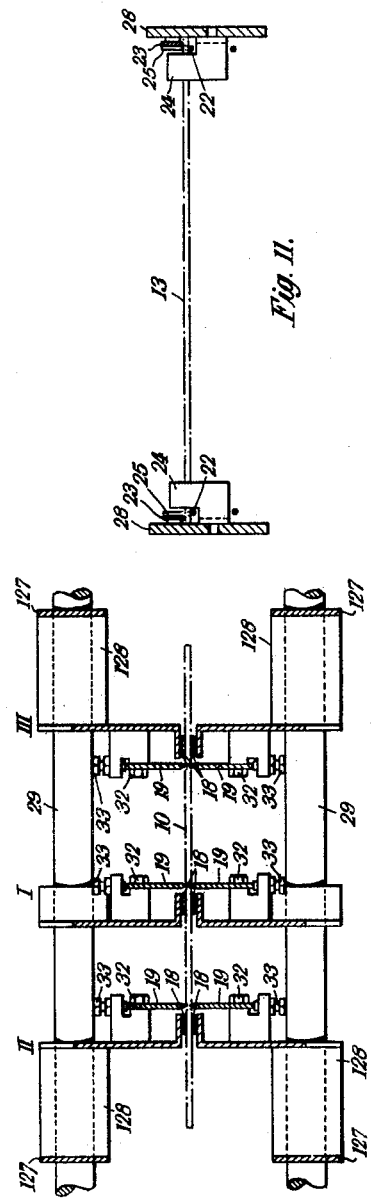
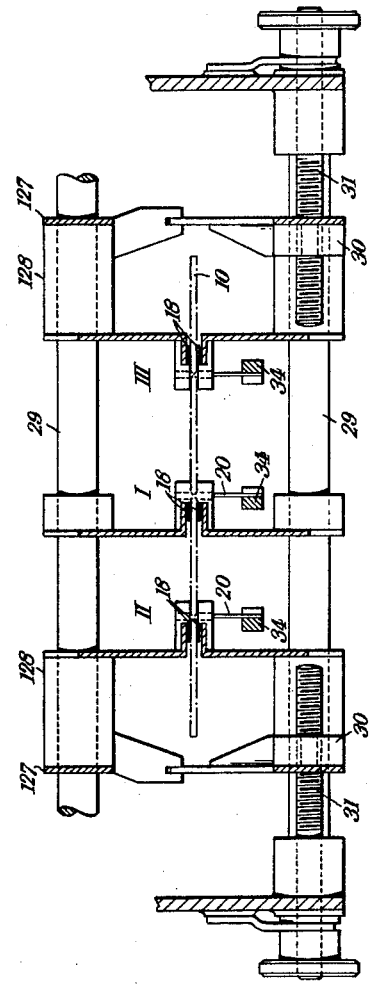
INVENTOR
Joseph J. Dunton
By Watson, Cole, Grindle & Watson
ATTORNEYS

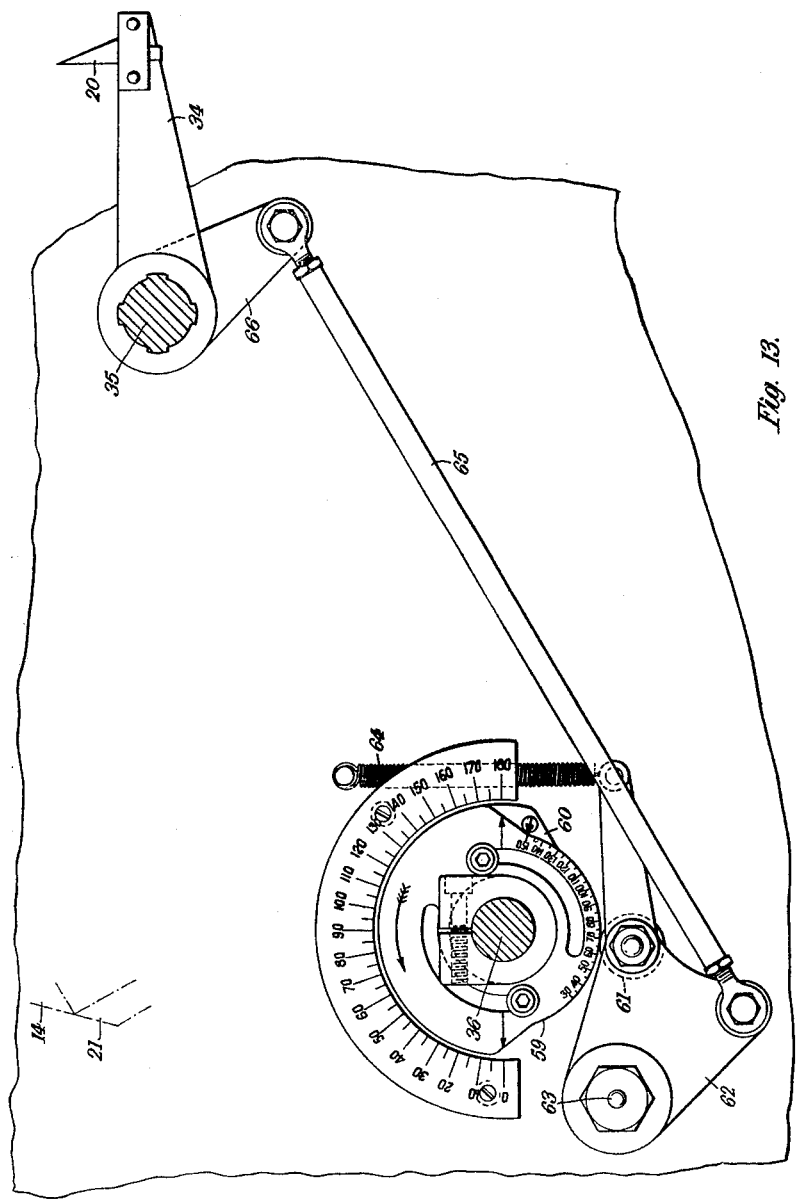

United States Patent Office 3,152,526
Patented Oct. 13, 1964

3,152,526
MECHANISM FOR THE PRODUCTION OF
CARTON BLANKS
Joseph John Dunton, Dewsbury, England, assignor to
The Forgrove Machinery Company Limited, Leeds,
England, a company of Great Britain
Filed Nov. 1, 1962, Ser. No. 234,599
4 Claims. (Cl. 93—58)

This invention provides mechanism for producing from a reel of corrugated paper or the like scored and slit carton blanks and advancing the blanks to a discharge station from which they are delivered in succession to any desired further mechanism, e.g. a carton forming machine.

The mechanism according to the invention comprises a plurality of pairs of upper and lower driving belts for gripping the upper and lower surfaces of the web of corrugated paper and feeding it forward, blades positioned to score the web longitudinally along a plurality of parallel lines, slitting knives for producing slits in the web at regular intervals in each line of scoring, a cutter for severing the scored and slit web transversely across the slits to cut blanks in succession from the leading end of the web and means for transferring the blanks individually and in succession from the driving belts to the discharge station.

Two embodiments of the invention will now be described in more detail, by way of example, with reference to the accompanying drawings in which:

FIG. 1 is a diagrammatic side elevation of the first form of mechanism,

FIG. 2 is a corresponding diagrammatic plan view,

FIGS. 3 and 4 are respectively sections on the lines B—B and A—A in FIG. 1,

Figure 14:
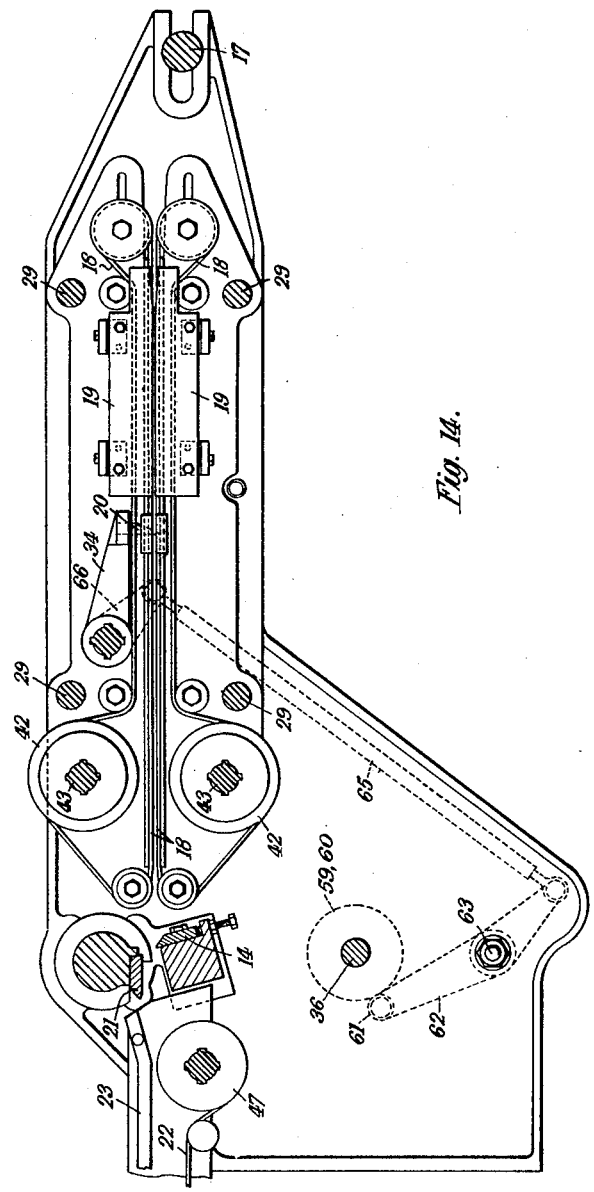

FIG. 5 is a more detailed plan view on a larger scale of the right hand portion of the mechanism shown in FIGS. 1-4, FIG. 6 is a similar view of the left hand portion of the mechanism shown in FIGS. 1-4, FIG. 7 is a section taken on the line VII—VII in FIG. 5, FIGS. 8 and 9 are respectively sections taken on the lines VIII—VIII and IX—IX in FIG. 5, FIG. 10 is a section on the line X—X in FIG. 6, FIG. 11 is a section on the line XI—XI in FIG. 10, FIG. 12 is a side elevation of the gear train utilized to drive the rotary cutting knife.

FIG. 13 is a side elevation showing the mechanism for operating the slitting knives, and FIG. 14 is a sectional view similar to FIG. 7 showing the second form of mechanism.

Like reference characters denote like parts throughout the figures.

The first form of mechanism will first of all be described in general terms with reference to FIGS. 1-4.

A continuous web 10 of paper corrugated on one side only is drawn from a reel, not shown, over a roller 17, and fed forward with its corrugated side downwards, by three pairs of driving belts 18, its edges being guided by fixed side guides 27. As will be noted the corrugations are on the underside of the web 10 and are presented to the lower belts 18.

While the corrugated paper web is between the driving belts 18 it is first scored by stationary scoring blades 19 as shown in FIG. 3 in three parallel lines 11. Thereafter, movable slitting knives 20, FIG. 4, pierce the web in line with the scoring 11 for a short distance producing short parallel slits 12. The slitting knives 20 are controlled by an adjustable cam and linkage as later described.

Each carton blank 13 is separated from the leading end of the web by a rotary knife 21, but before this the leading edge of the blank is lightly gripped at each side between elastic transfer belts 22 and top pressure guides 23 which, if desired, may be replaced by rollers or a top belt. The elastic belts 22 are driven continuously at a much higher speed than the driving belts 18 and consequently urge the carton blank trapped above them forward at a greater speed. Thus as soon as the rotary knife 21 severs the carton blank from the following web the severed blank 13 is accelerated forward creating a gap into which the succeeding blank can be fed. The rotary knife 21 coacts with a fixed knife 14.

The severed blank moves quickly forward until its leading end is arrested by stops 24. As the blank approaches the stops it passes beneath stationary latches 25 which thereafter engage the trailing end of the severed blank to prevent it from rebounding from the stops 24. Side guides 28 are fitted to prevent the severed blank from sliding sideways.

When arrested by the stops 24, the severed blank is positioned above carton bars 1 which lift it into the jaws 41 of a pocket wheel, an elevator (not shown) thereafter lifting a commodity to be packed, e.g. a batch of biscuits, into the carton blank held in the jaws 41. A central support 26 may be provided between the rotary knife 1 and the carton bars to support the centre of the blank and prevent any sag.

The apparatus is adjustable for length of blank width. To adjust the pitch of scoring, the outer belt assemblies II and III in FIG. 2, which include the driving belts 18, scoring blades 19 and slitting knives 20, can be moved sideways and retained in any desired position. The centre belt assembly I is fixed with the scoring blade on the centre line of the web.

As shown in FIGS. 5, 8 and 9 the belt assemblies II and III are mounted on frames 127 which carry sleeves 128 embracing cross members 29 of the machine frame and nuts 30 engaging adjustable screws 31. By adjustment of the screws therefore the belt assemblies can be adjusted laterally in relation to the belt assembly I. The constituent parts of the belt assembly I are supported on a similar fixed frame. The scoring blades 19 are held to the frames by screws 32 engaging vertical slots in the blades and are adjustable for height by means of screws 33. As shown in FIGS. 7 and 13, each slitting knife is carried by an arm 34 splined to a common shaft 35 for actuating all the slitting knives.

The belts 18, 22, the scoring blades 19 and the rotary knife 21 are all driven from a main drive shaft 36. The belts 18 are driven from the shaft 36 by meshing gears, 38, 39, 40, 71 as shown in FIG. 7, the gears 40 and 71 being attached to shafts 43 carrying pulleys 42 for driving the belts. The length of the blank is controlled by the speed of the belts 18 and this is adjusted by changing the gear 38 on the main shaft 36 which engages the idler gear 39, which is mounted on a swinging arm 44 pivoted to the lower belt pulley shaft 43 and carrying a stud 45 engaging an arcuate slot 46 in the machine framework.

The pulleys 47 (FIG. 7) driving the belts 22 are driven from the shaft 36 by a train of gears 48, 49, 50, 51.

The rotary knife 21 is driven from the shaft 36 by the eccentric gearing shown most clearly in FIG. 12. This consists of a gear 52 eccentrically mounted on the shaft 36 and driving, through a gear 53, a gear 54 on a shaft 55 carrying the knife 21. The gear 53 is pivoted on a pin 56 interconnecting links 57, 58 pivoted respectively to the gears 52 and 53. By varying the position of this gear train in relation to the knife 21 and the shaft 36 the actual velocity of the knife at the moment of severance of the blank may be matched to the speed of travel of the corrugated web. This adjustment may be made by turning the link 58 in relation to the gear 54 and to assist the operator index marks may be provided on the gear 54 and a corresponding pointer on the link 58.

The slitting knives 20 are operated, as shown in FIG. 13, by a composite cam consisting of two sections 59, 60 mounted on the main shaft 36 and coacting with a follower 61 mounted on a cam lever 62 pivoted on a pin 63 and held by a spring 64 in contact with the cam. The cam lever 62 is connected by a link 65 to an arm 66 on the shaft 35 referred to previously. The length of the slits formed in the corrugated web may be altered by moving the two sections 59, 60 of the cam in relation to one another, and the positions at which the slits are formed in the web may be varied by turning the composite cam as a unit about the shaft 36.

As shown in FIGS. 6 and 10 the stops 24 and latches 25 are adjustable to suit the length of the blank. The stops 24 carry bolts 67 engaging longitudinal slots 68 in the machine frame and capable of being locked by lock nuts in any desired position of adjustment in the slots. The latches 25 are positioned by locking screws 70 provided on the machine frame and engaging slots 69 in the latches. Provisions may be made, if desired, for adjusting the belts 22 and guides 23 sideways to suit variations in the width of the blanks.

The alternative form of mechanism shown in FIG. 14 corresponds in all essentials to that already described but is intended for use with a corrugated web fed to the belts 18 with its corrugations uppermost. The slitting knives 20 and the rotary knife 21 are accordingly situated above the web instead of below it as in the mechanism shown in FIGS. 1–13. This modified mechanism is intended for use when the carton blank is formed around a descending mandrel and deposited in a pocketed conveyor for subsequent filling by hand.

What I claim as my invention and desire to secure by Letters Patent is:

1. Mechanism for converting a web of corrugated paper having a plain surface and a corrugated surface into scored and slit carton blanks, comprising a plurality of laterally spaced pairs of upper and lower driving belts which extend longitudinally of the web and are effective to grip the upper and lower surfaces of the web, driving means for imparting continuous movement to said belts to feed the web forward, a pair of stationary scoring blades, positioned adjacent each pair of belts, which respectively engage the upper and lower surfaces of the web to form continuous longitudinal lines of scoring on said surfaces, a slitting knife situated adjacent each pair of belts, means for periodically moving said slitting knives towards the corrugated surface of the web and then away again so that said knives form slits in the web at regular intervals in each of said lines of scoring, a transverse cutter, and means for actuating said cutter to sever the scored and slit blanks transversely into cut blanks at locations situated midway of said slits.

2. Mechanism as claimed in claim 1, which includes a center pair of belts and two outer pairs of belts, each pair of belts being mounted in a frame carrying the associated pair of scoring blades, the frames mounting said outer pairs of belts being adjustable laterally in relation to the frame carrying said inner pair of belts and said slitting knives being carried by arms which are adjustable laterally on a common shaft extending transversely to said web.

3. Mechanism as claimed in claim 1, wherein each of the slitting knives is pivotally mounted and comprising a shaft, a single composite cam for operating all the slitting knives, said cam comprising sections which are adjustable on said shaft in relation to one another to vary the length of the slits produced in the web and said composite cam being adjustable as a whole in relation to the shaft to vary the position of the slits in the web, means for rotating the shaft and operative connections between the slitting knives and the individual sections of the cam for moving said knives about their pivots towards and away from the web.

4. Mechanism as claimed in claim 1, which includes elastic transfer belts travelling faster than said driving belts for receiving the blanks from the driving belts and carrying them in spaced relation to a discharge station, a stop for arresting the leading end of each blank as it reaches the discharge station, a latch disposed above the transfer belts and arranged to engage the trailing edge of each blank as it is arrested by the stop and means at the discharge station for removing the blanks in succession from the transfer belts.

References Cited in the file of this patent

UNITED STATES PATENTS

| | | |
|---|---|---|
| 1,360,048 | Stock | Nov. 23, 1920 |
| 2,257,446 | Amidon | Sept. 30, 1941 |
| 2,262,303 | Staude | Nov. 11, 1941 |
| 2,662,452 | Sidebotham | Dec. 15, 1953 |
| 2,814,344 | Oberem | Nov. 26, 1957 |
| 2,982,189 | Shields | May 2, 1961 |